United States Patent [19]
Kim et al.

[11] Patent Number: 5,897,959
[45] Date of Patent: Apr. 27, 1999

[54] BIAXIALLY EXTENDED POLYESTER FILM

[75] Inventors: Sang-Il Kim; Byoung-Ho Cho, both of Kyungki-do, Rep. of Korea

[73] Assignee: SKC Limited, Kyungki-do, Rep. of Korea

[21] Appl. No.: 08/752,509

[22] Filed: Nov. 20, 1996

[30] Foreign Application Priority Data

Nov. 24, 1995 [KR] Rep. of Korea ...................... 95-43668

[51] Int. Cl.⁶ ........................... B32B 27/18; B32B 27/36
[52] U.S. Cl. ........................... 428/480; 428/458; 428/910; 524/127; 524/128; 524/151; 524/153; 524/287; 524/342
[58] Field of Search ..................................... 428/480, 910, 428/458; 524/151, 153, 127, 128, 147, 287, 342

[56] References Cited

U.S. PATENT DOCUMENTS

| | | | |
|---|---|---|---|
| 5,166,239 | 11/1992 | Memon et al. | 524/120 |
| 5,298,540 | 3/1994 | Pauquet et al. | 524/94 |
| 5,562,984 | 10/1996 | Mortlock et al. | 428/364 |
| 5,643,985 | 7/1997 | Hoffmann et al. | 524/291 |

*Primary Examiner*—Vivian Chen
*Attorney, Agent, or Firm*—Anderson, Kill & Olick, P.C.

[57] ABSTRACT

A biaxially extended polyester film which comprises a polyester resin having ethylene A biaxially oriented polyester film comprises a polyester resin having ethylene terephthalate and ethylene isophthalate repeating units in a weight ratio of 90:10 to 75:25; 0.02 to 0.06 weight % of an organic phosphite or phosphate ester; and 0.01 to 0.05 weight % of a hindered phenol compound, wherein the film possesses good thermal stability, processability, and thermal adhesive strength to a metal surface and is useful in forming the inner laminate layer of a metal container.

4 Claims, No Drawings

BIAXIALLY EXTENDED POLYESTER FILM

FIELD OF THE INVENTION

The present invention relates to a biaxially extended polyester film having excellent physical and laminating properties.

BACKGROUND OF THE INVENTION

Polyesters such as polyethylene terephthalate (PET) are known to possess good chemical stability, physical and mechanical strength, durability, heat resistance, chemical resistance, weather resistance and electrical insulation property and, therefore, have been widely used in manufacturing various articles including medical devices, capacitors, packaging and labelling materials, photographic film and magnetic recording media.

Recently, an increasing amount of polyester resins has been used in laminating inner surface of metal containers such as cans because they can be conveniently laminated to a metal surface without the use of any solvent. However, a conventional polyester resin generally has poor adhesiveness, and therefore, it requires an adhesive in such a laminating process. The use of an adhesive however causes the problem of a high production cost and the risk of contaminating the content. Moreover, a conventional polyester film tends to have a high crystallization degree and the processability thereof is poor, i.e., it may be torn or broken in a further processing step.

In order to solve such problems, U.S. Pat. No. 5,424,121 discloses the use of a polyester copolymer having good thermal adhesive strength and low crystallinity in laminating a food container. However, a film prepared from this polyester copolymer has the disadvantages that it has low thermal stability and that the laminate is easily deformed and discolored by thermal oxidation.

SUMMARY OF THE INVENTION

It is, therefore, an object of the present invention to provide a biaxially extended polyester film having good thermal stability, processability and adhesive strength to a metal surface.

In accordance with an aspect of the present invention, there is provided a biaxially extended polyester film comprising a polyester resin having ethylene terephthalate and ethylene isophthalate repeating units in a weight ratio of 95:5 to 65:35, and an organic phosphate or phosphite ester in an amount ranging from 0.005 to 0.2 wt % and a hindered phenol compound in an amount ranging from 0.005 to 0.2 wt % based on the weight of the polyester resin.

DETAILED DESCRIPTION OF THE INVENTION

A polyester resin suitable for use in preparing the polyester film of the present invention may be prepared by polycondensing a mixture of terephthalic and isophthalic acid components with an aliphatic glycol. The polyester resin of the present invention comprises ethylene terephthalate repeating unit and ethylene isophthalate repeating unit in a weight ratio of 95:5 to 65:35, preferably 90:10 to 80:20 in the chain, and has an intrinsic viscosity of 0.55 to 0.75 dl/g, preferably 0.6 to 0.70 dl/g.

If the content of the ethylene isophthalate repeating unit in the polyester resin of the present invention is less than 5 wt %, the adhesive strength of the polyester film to a metal surface becomes low while the crystallinity of the resin tends to be very high, leading to the problem that the film may be torn or broken in further processing. If the content of the ethylene isophthalate unit, on the other hand, exceeds 35 wt %, the resin tends to have a very low degree of crystallization and the film thereof has low thermal stability and becomes a poor material for laminating a food container.

Further, if the intrinsic viscosity of the polyester resin is less than 0.55 dl/g, the resin becomes highly crystalline and the film prepared therefrom is easily torn or broken in a further processing step. And, if the viscosity of the resin exceeds 0.75 dl/g, it is difficult to prepare a sheet or film having a uniform thickness.

The polycondensation catalyst which can be used in preparing the polyester resin of the present invention may be any one conventionally used in the art such as titanium, germanium, tin, antimony, zinc, cobalt, aluminum, lead, manganese and calcium compounds, and a mixture thereof.

In the present invention, an organic phosphate or phosphite ester is employed in order to enhance the thermal stability of the polyester resin and also to prevent the formation of complexes during the preparation step of the polyester resin. Preferred phosphate and phosphite esters may include triphenyl phosphate, tricresyl phosphate, trimethyl phosphate, triethyl phosphate, tributyl phosphate, trixyrenyl phosphate, xyrenyl diphenyl phosphate, cresyl diphenyl phosphate, di-stearylpentaerythritol diphosphite, bis 2,4-di-t-butylphenyl-pentaerythritol diphosphite, tris 2,4-di-t-butylphenylpentaery-thritol diphosphite, and a mixture thereof.

The hindered phenol compound used in the present invention is an oxidation inhibitor which functions as a radical chain inhibitor in a thermal oxidation reaction of the polyester resin and it, together with the phosphate or phosphite ester, improves the thermal stability of the polyester resin. Representative hindered phenol compounds include tetrakis 3,5-di-t-butyl-hydroxyphenylpropanoxymethylmethane, octadecyl 3,5-di-t-butyl-hydroxyphenyl-propanoate, 2-hydroxy-4-n-octabenzophenone, 2,4-di-t-butylphenyl 3,5-di-t-butyl-4-hydroxybenzoate, and amixture thereof.

Each of the phosphate or phosphite compound and the hindered phenol compound to be introduced in the polyester film of the present invention may be preferably employed in an amount ranging from 0.005 to 0.2 wt % based on the weight of the polyester resin employed. If the amount of the either additive is less than 0.005 wt %, the effect of improving the thermal stability of the film becomes insignificant, whereas if the amount exceeds 0.2 wt %, the film strength becomes inferior and the film may turn colored during the laminating process.

Besides the above-mentioned additives, the polyester film of the present invention may further contain other common additives such as inorganic fillers, antioxidants, antistatic agents, heat stabilizers and dyes. Such additives may be added at any time during the preparation of the polyester, preferably immediately prior to the polycondensation step.

The biaxially extended polyester film of the present invention may be prepared as follows. At first, a polyester resin comprising ethylene terephthalate and ethylene isophthalate repeating units in a specified weight ratio and having a specified intrinsic viscosity and melting point was prepared by polycondensing a mixture of terephthalic acid and isophthalic acid with ethylene glycol. The polyester resin is then melt-extruded into an amorphous cast sheet using a T-die method, and the resulting sheet is subsequently quenched and biaxially extended by a conventional method to produce a biaxially extended polyester film. The thickness of the polyester film may be controlled depending on the final use of the film. The polyester film of the present invention generally has a melting point of 185 to 230° C., preferably 195 to 220° C.

The following Examples are intended to illustrate the present invention more specifically, without limiting the scope of the invention.

In the Examples and Comparative Examples, the properties of the polyester resin or films produced were evaluated in accordance with the following methods.

1. Intrinsic Viscosity

The intrinsic viscosity of a polyester resin was determined by dissolving 0.1 g of the resin sample in 25 ml of a 60:40 (w/w) mixture of phenol and tetrachloroethane and measuring the viscosity of the solution with viscometer, Skyvis 4000 (a product of SKC Limited, Korea) at 35° C.

2. Melting Point

The melting point of a polyester film was determined by heating the film sample to a temperature of 300° C., quenching the molten resin and re-heating the quenched resin at a rate of 20° C./min using a differential scanning thermal analyzer (DSC-7, Perkin-Elmer) while observing the peak point.

3. Strength at Breakage

The strength ar breakage of a polyester film was determined in accordance with ASTM D 882.

4. Thermal Adhesion

The thermal adhesion of a polyester film was determined by placing the film sample on an iron (Fe) plate which is free of tin and heated to 290° C., passing the resulting laminate between two rubber rollers at a pressure of 5 kgf/cm$^2$ and a speed of 120 m/min to compress it, quenching the compressed laminate by spraying cooling water thereon, stretching the quenched laminate by 1%, and subjecting the stretched laminate to a 180° peeling test. The thermal adhesion was considered as "good" when the laminate was torn in the peeling test.

4. Thermal Stability

The thermal stability of a polyester film was evaluated by observing the surface of the film sample which was subjected to the thermal adhesion test. When the film surface is not deformed or discolored, the film was considered to have good thermal stability.

5. Processability

The processability of a polyester film was evaluated by observing the occurrence of wrinkling, contraction or fogging phenomena of the film in a further processing step.

EXAMPLE 1

A mixture of terephthalic acid and isophthalic acid in a molar ratio of 84:16 was mixed with ethylene glycol in an equivalent ratio of 1:2. To 100 parts by weight of the resulting mixture, 0.15 part by weight of silicon dioxide having an average particle diameter of 1.2 $\mu$m, 0.02 part by weight of bis 2,4-di-t-butylphenylpentaerythritol diphosphite, 0.02 part by weight of triphenyl phosphate and 0.03 part by weight of tetrakis 3,5-di-t-butyl-hydroxyphenylpropanoxymethylmethane were added. The resulting mixture was polycondensed to obtain a polyester resin having an intrinsic viscosity of 0.620 dl/g.

The resin was then melt-extruded using a T-die method to form a cast sheet and the sheet was biaxially extended to provide a biaxially extended film having a uniform thickness of 40 $\mu$m, a melting point of 211° C. and a strength at breakage of 19.2 kg/mm$^2$.

The properties of the polyester films thus obtained were measured and the results are shown in Table 1.

EXAMPLES 2 to 6

The procedure of Example 1 was repeated except for varying the amounts of isophthalic acid and the additives, within the scope of the present invention, as shown in Table 1.

COMPARATIVE EXAMPLES 1 and 8

The procedure of Example 1 was repeated except for varying the amounts of isophthalic acid and the additives, and the viscosity of the resin, out of the scope of the present invention, as shown in Table 1.

TABLE 1

| | | Amount of Additives | | | Properties | | | | | | |
|---|---|---|---|---|---|---|---|---|---|---|---|
| | | (A)* | (B)** | (C)*** | | | | | | | |
| | I.A. | (parts by weight) | (parts by weight) | (parts by weight) | I.V. (dl/g) | M.P. (° C.) | St. (Kg/ mm$^2$) | Th. Uni. | Ad. | Sta. | Proc. |
| Ex. | | | | | | | | | | | |
| 1 | 16 | 0.02 | 0.02 | 0.03 | 0.620 | 211 | 19.2 | Good | Good | Good | Good |
| 2 | 16 | 0.00 | 0.05 | 0.04 | 0.617 | 210 | 19.0 | Good | Good | Good | Good |
| 3 | 16 | 0.03 | 0.03 | 0.01 | 0.621 | 212 | 19.5 | Good | Good | Good | Good |
| 4 | 16 | 0.06 | 0.00 | 0.05 | 0.609 | 211 | 18.8 | Good | Good | Good | Good |
| 5 | 10 | 0.02 | 0.02 | 0.03 | 0.635 | 223 | 20.7 | Good | Good | Good | Good |
| 6 | 25 | 0.02 | 0.02 | 0.03 | 0.606 | 202 | 18.4 | Good | Good | Good | Good |
| Com. Ex. | | | | | | | | | | | |
| 1 | 45 | 0.02 | 0.02 | 0.03 | 0.613 | 175 | 13.9 | Good | Good | Poor | Good |
| 2 | 0 | 0.02 | 0.02 | 0.03 | 0.624 | 256 | 21.5 | Good | Poor | Good | Poor |
| 3 | 2 | 0.02 | 0.02 | 0.03 | 0.621 | 245 | 21.1 | Good | Poor | Good | Poor |
| 4 | 16 | 0.02 | 0.02 | 0.002 | 0.617 | 211 | 19.7 | Good | Poor | Good | Good |
| 5 | 16 | 0.01 | 0.50 | 0.03 | 0.623 | 211 | 12.4 | Poor | Good | Good | Good |
| 6 | 16 | 0.001 | 0.001 | 0.03 | 0.615 | 210 | 20.0 | Good | Poor | Good | Good |

TABLE 1-continued

|   | I.A. | Amount of Additives | | | Properties | | | | | | | |
|---|---|---|---|---|---|---|---|---|---|---|---|---|
|   |   | (A)* (parts by weight) | (B)** (parts by weight) | (C)*** (parts by weight) | I.V. (dl/g) | M.P. (° C.) | St. (Kg/ mm²) | Th. Uni. | Ad. | Sta. | Proc. |   |
| 7 | 16 | 0.02 | 0.02 | 0.03 | 0.820 | 211 | 19.2 | Poor | Poor | Good | Good |
| 8 | 16 | 0.02 | 0.02 | 0.03 | 0.510 | 208 | 14.8 | Good | Good | Good | Poor |

Foot Note:
I.A.: Partial molar ratio of isophthalic acid,
(A)*: Bis 2,4-di-t-butylphenyl-pentaerythritol diphosphite,
(B)**: Triphenyl phosphate
(C)***: Tetrakis 3,5-di-t-butyl-hydroxyphenylpropanoxymethylmethane
I.V.: Intrinsic viscosity, St.: Strength at Breakage, Th. Uni.: Thickness Uniformity
Ad.: Thermal adhesion, Sta.: Thermal stability, Pro.: Further-Processing Resistance Table 1 shows that the biaxially extended polyester films containing an organic phosphite or phosphate ester or a mixture thereof and a hindered phenol compound in specified amounts in accordance with the present invention have excellent physical and laminating properties such as good thermal adhesion, thermal stability and processability.

While the invention has been described with respect to the above specific embodiments, it should be recognized that various modifications and changes may be within the scope of the invention as defined by the claims the follow.

What is claimed is:

1. A biaxially extended polyester film which comprises a polyester resin having ethylene terephthalate and ethylene isophthalate repeating units in a weight ratio of 90:10 to 75:25, and an organic phosphite or phosphate ester in an amount ranging from 0.02 to 0.06 wt % and a hindered phenol compound in an amount ranging from 0.01 to 0.05 wt % based on the weight of the polyester resin.

2. The polyester film of claim 1 wherein the polyester resin has an intrinsic viscosity of 0.55 to 0.75 dl/g.

3. The polyester film of claim 1 wherein the organic phosphite or phosphate ester is selected from the group consisting of triphenyl phosphate, tricresyl phosphate, trimethyl phosphate, triethyl phosphate, tributyl phosphate, trixyrenyl phosphate, xyrenyl diphenyl phosphate, cresyl diphenyl phosphate, di-stearylpentaerythritol diphosphite, bis 2,4-di-t-butylphenylpentaerythritol diphosphite, tris 2,4-di-t-butylphenylpentaerythritol diphosphite, and a mixture thereof.

4. The polyester film of claim 1 wherein the hindered phenol compound is selected from the group consisting of tetrakis 3,5-di-t-butyl-hydroxyphenylpropanoxymethylmethane, octadecyl 3,5-di-t-butyl-hydroxyphenylpropanoate, 2-hydroxy-4-n-octabenzophenone, 2,4-di-t-butylphenyl 3,5-di-t-butyl-4-hydroxybenzoate, and a mixture thereof.

* * * * *